United States Patent
Jost et al.

(10) Patent No.: US 10,161,691 B2
(45) Date of Patent: Dec. 25, 2018

(54) MULTI-CHANNEL COOLING PLENUM

(75) Inventors: Karen M. Jost, St. Louis, MO (US);
Gayl J. Miller, Edwardsville, IL (US);
Donald E. Bowdle, Wentzville, MO (US)

(73) Assignee: The Boeing Company, Chicago, IL (US)

(*) Notice: Subject to any disclaimer, the term of this patent is extended or adjusted under 35 U.S.C. 154(b) by 785 days.

(21) Appl. No.: 13/351,026

(22) Filed: Jan. 16, 2012

(65) Prior Publication Data
US 2013/0180691 A1    Jul. 18, 2013

(51) Int. Cl.
| | |
|---|---|
| F28F 3/12 | (2006.01) |
| B64G 1/50 | (2006.01) |
| F01D 9/02 | (2006.01) |
| F02K 1/82 | (2006.01) |
| F02K 9/97 | (2006.01) |
| F23R 3/00 | (2006.01) |
| B64G 1/58 | (2006.01) |
| B64D 13/00 | (2006.01) |
| F28D 21/00 | (2006.01) |

(52) U.S. Cl.
CPC .................. *F28F 3/12* (2013.01); *B64G 1/50* (2013.01); *B64G 1/58* (2013.01); *F01D 9/023* (2013.01); *F02K 1/822* (2013.01); *F02K 9/972* (2013.01); *F23R 3/002* (2013.01); *F23R 3/005* (2013.01); *B64D 13/006* (2013.01); *F28D 2021/0021* (2013.01); *F28F 2275/02* (2013.01)

(58) Field of Classification Search
CPC ..... B64G 1/58; B64G 1/50; F28D 2021/0021; B64D 13/006; F02K 1/822; F02K 9/972; F28F 3/12

USPC .............................. 165/170, 168, 169, 134.1
See application file for complete search history.

(56) References Cited

U.S. PATENT DOCUMENTS

| | | | | | |
|---|---|---|---|---|---|
| 2,135,981 | A | * | 11/1938 | Marchner | B60H 1/00271 |
| | | | | | 165/170 |
| 2,923,068 | A | * | 2/1960 | Wells | 165/170 |
| 3,273,637 | A | * | 9/1966 | Pauls | B21D 53/045 |
| | | | | | 165/171 |
| 4,285,397 | A | * | 8/1981 | Ostbo | 165/170 |

(Continued)

FOREIGN PATENT DOCUMENTS

| | | |
|---|---|---|
| CN | 11314505 A | 10/1996 |
| CN | 1832883 A | 9/2006 |

(Continued)

OTHER PUBLICATIONS

English translation of an Official Action of the Substantive Examination prepared by the Federal State Intellectual Property Service in application No. 2013100385/07 (000529), dated Jan. 27, 2017.

(Continued)

*Primary Examiner* — Leonard R Leo
(74) *Attorney, Agent, or Firm* — McDonnell Boehnen Hulbert & Berghoff LLP (57) ABSTRACT

A cooling bond pad and methods are disclosed. A plurality of internal-cooling channels cool the cooling bond pad, and an internal-flow channel is coupled to the internal-cooling channels, and directs an internal-coolant flow to the internal-cooling channels. An external-flow channel directs a through-coolant flow through the cooling bond pad.

26 Claims, 7 Drawing Sheets

(56) References Cited

U.S. PATENT DOCUMENTS

| | | | | |
|---|---|---|---|---|
| 4,386,505 | A | * | 6/1983 | Little .................. B21D 53/045 165/168 |
| 4,697,425 | A | * | 10/1987 | Jones ....................... F25B 9/02 62/46.3 |
| 4,815,534 | A | * | 3/1989 | Fuerschbach ......... F28D 9/0075 165/166 |
| 4,820,097 | A | * | 4/1989 | Maeda et al. ................. 165/168 |
| 4,898,153 | A | * | 2/1990 | Sherwood ............... F24J 2/202 165/170 |
| 5,115,858 | A | * | 5/1992 | Fitch et al. .................... 165/170 |
| 5,216,886 | A | * | 6/1993 | Ewing ............................. 60/752 |
| 5,388,765 | A | | 2/1995 | Hill et al. |
| 5,435,379 | A | * | 7/1995 | Moslehi ................ F04B 23/028 165/80.4 |
| 5,435,383 | A | * | 7/1995 | Rajagopal ............... F28F 3/046 165/166 |
| 5,458,185 | A | * | 10/1995 | Mizuno ............. H05K 7/20281 165/286 |
| 5,645,127 | A | | 7/1997 | Enderle et al. |
| 5,647,202 | A | | 7/1997 | Althaus |
| 5,823,252 | A | * | 10/1998 | Waitkat ................ F28D 9/0081 165/166 |
| 2004/0194941 | A1 | * | 10/2004 | Larrieu .................... F02K 9/64 165/170 |
| 2004/0245373 | A1 | | 12/2004 | Behrens et al. |
| 2004/0245389 | A1 | | 12/2004 | Behrens et al. |
| 2008/0105402 | A1 | | 5/2008 | Behrens et al. |
| 2010/0300669 | A1 | | 12/2010 | Jacobsen et al. |
| 2011/0110771 | A1 | | 5/2011 | Morgan et al. |

FOREIGN PATENT DOCUMENTS

| | | |
|---|---|---|
| CN | 102052093 A | 5/2011 |
| RU | 2415523 | 3/2011 |
| SU | 736390 | 5/1980 |

OTHER PUBLICATIONS

Extended European Search Report prepared by the European Patent Office in Application No. 13150767.5, dated Nov. 10, 2017.
Office Action, Canadian Patent Application No. 2,793,177, dated Jan. 15, 2016, 4 pages.
Office Action, Chinese Patent Application No. 201310016138.6, dated Nov. 12, 2015 (with English translation), 24 pages.
Office Action, Chinese Patent Application No. 201310016138.6, dated May 12, 2016 (with English translation), 6 pages.
English translation of a Notification on Examination for Patentability prepared by the Federal State Intellectual Property Service in application No. 2013100385/07 (000529), dated Apr. 14, 2017.

\* cited by examiner

MULTI-CHANNEL COOLING PLENUM

FIELD

Embodiments of the present disclosure relate generally to cooling systems. More particularly, embodiments of the present disclosure relate to structural cooling systems.

BACKGROUND

Current state of the art thermal protection systems products are not easily repaired in service because the current thermal protection systems products do not have a rapid repair capability.

SUMMARY

A cooling system and methods for a cooling bond pad are disclosed. A plurality of internal-cooling channels cools the cooling bond pad. An internal-flow channel is coupled to the internal-cooling channels, and directs an internal-coolant flow to the internal-cooling channels. An external-flow channel directs a through-coolant flow through the cooling bond pad.

In this manner, a cooling bond pad is provided that can cool a bond line and allow moderate temperature coupling means such as, but without limitation, a bond line, an adhesive, a weld, a superplastic diffusion, a mechanic coupling, or other coupling means for coupling to an object to be used in an environment that may otherwise be a high temperature environment. Thus an additional body such as a heat/thermal shield may be coupled to the cooling bond pad. Furthermore, the cooling bond pad may be used to transfer a coolant through the cooling bond pad to cool the thermal shield.

In an embodiment, a cooling bond pad comprises internal-cooling channels, at least one internal-flow channel, and at least one external-flow channel. The internal-cooling channels cool the cooling bond pad, and the internal-flow channel is coupled to the internal-cooling channels and directs an internal-coolant flow to the internal-cooling channels. The external-flow channel directs a through-coolant flow through the cooling bond pad.

In another embodiment, a method for cooling a cooling bond pad directs an internal-coolant flow to a plurality of internal-cooling channels via at least one internal-flow channel. The method further cools the cooling bond pad using the internal-coolant flow, and directs a through-coolant flow through the cooling bond pad using at least one external-flow channel.

In a further embodiment, a method for providing a cooling bond pad provides a plurality of internal-cooling channels operable to cool the cooling bond pad. The method further provides at least one internal-flow channel coupled to the internal-cooling channels, and operable to direct an internal-coolant flow to the internal-cooling channels. The method further provides at least one external-flow channel operable to direct a through-coolant flow through the cooling bond pad.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to cooling systems, cooling mechanisms, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, an aircraft thermal shield. Embodiments of the disclosure, however, are not limited to such aircraft thermal shield applications, and the techniques described herein may also be utilized in other applications. For example but without limitation, embodiments may be applicable to furnaces, blast furnaces, rocket nozzles, plasma generators, nuclear fission reactors, fusion reactors, solar power towers, kilns, refrigerators, and other thermal applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

A cooling bond pad may be made from for example but without limitation, ceramic foam, composite material, metal, plastic, or other material. A ceramic foam thermal shield is an excellent thermal insulator, but it is brittle and can become deformed in service. Therefore, it is advantageous to have a hot surface thermal protection system such as a multi-channel cooling bond system described herein that provides a means for rapidly replaceable ceramic foam insulation. In addition, the multi-channel cooling bond system/material can be actively cooled in order to increase its survivability. Cooling flow rates, pressures, and temperatures are tailored in order to ensure adequate surface cooling and structural bond line cooling for changing operational scenarios.

Embodiments of the disclosure substantially solve maintenance problems associated with hot surface thermal protection systems by allowing for rapid, in-service repair and replacement. In addition, replaceable thermal insulation units allow for easy access, modification, and optimization of a cooling system that improves survivability. Embodiments of the disclosure provide a multi-channel cooling bond pad with a rapidly replaceable thermal insulation with tailor-able multi-channel plenum cooling.

Figure 1:
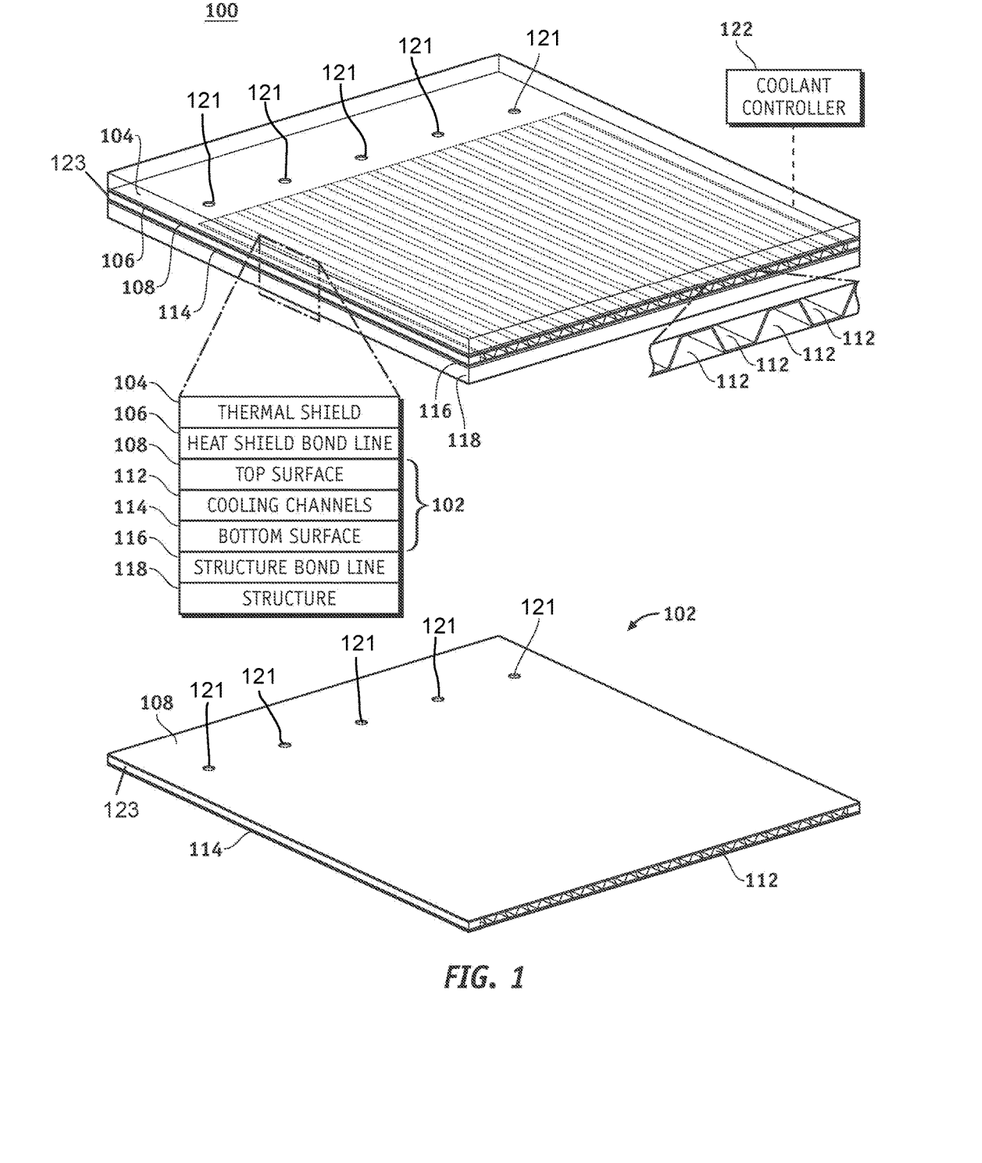
FIG. 1 is an illustration of a multi-channel cooling bond pad system according to an embodiment of the disclosure.

FIG. 1 is an illustration of a multi-channel cooling bond system 100 (system 100) according to an embodiment of the disclosure. The multi-channel cooling bond system 100 generally comprises a multi-channel cooling bond pad 102 (cooling bond pad 102), a thermal shield 104, a thermal shield bond line 106, a structure bond line 116, a structure 118, and a coolant controller 122.

The multi-channel cooling bond pad 102 may comprise a top surface 108, a plurality of internal-cooling channels 112, a bottom surface 114, a cooling bond pad layer 123, and a plurality of cooling holes 119, 120, and 121. The cooling bond pad layer 123 is disposed between and in direct contact with both the top surface 108 and the bottom surface 114.

The multi-channel cooling bond pad 102 may be made from a material such as, but without limitation, a composite material, or other material. The multi-channel cooling bond pad 102 may be coupled to an object via coupling means. For example but without limitation, the multi-channel cooling bond pad 102 may be attached to an object such as the structure 118 via the structure bond line 116 and to an object such as the thermal shield 104 via the thermal shield bond line 106. The coupling means may comprise, for example but without limitation, a bond line, an adhesive, a weld, a superplastic diffusion, a mechanic coupling, or other coupling means for coupling to the object. The object may comprise, for example but without limitation, a thermal shield, an aerodynamic body, a structure, or other object.

The multi-channel cooling bond pad 102 may be used to provide a thermal protection for the object and/or the coupling means coupled thereto. For example, the multi-channel cooling bond pad 102 may be used to provide a thermal protection for the structure 118 and/or the structure bond line 116 coupled to the structure 118. For another example, the multi-channel cooling bond pad 102 may be used to provide a thermal protection for the thermal shield 104 and/or the thermal shield bond line 106 coupled to the thermal shield 104. A cooling operation of the cooling bond pad 102 increases a survivability of the coupling means. The cooling operation is explained in more detail below.

The internal-cooling channels 112 are operable to cool the cooling bond pad 102 as explained in more detail below. In one embodiment, the internal-cooling channels 112 are located between the top surface 108 and the bottom surface 114 of the multi-channel cooling bond pad 102. Other configurations and arrangement of the internal-cooling channels 112 are also possible to allow cooling of the cooling bond pad 102.

The thermal shield 104 may comprise, for example but without limitation, a ceramic tile, a ceramic foam, a composite material, or other thermal shield.

The structure 118 may comprise, for example but without limitation, an aircraft structure, an aerodynamic body, or other structure.

The coolant controller 122 is configured to tailor the coolant characteristics to provide the multi-channel cooling bond pad 102 with various cooling flow rates, pressures, and temperatures through the internal-cooling channels 112, based on various operational scenarios. The coolants may comprise for example but without limitation, air, water, or other coolant.

In this manner, the multi-channel cooling bond pad 102 with a rapidly replaceable insulation is provided. The material of the multi-channel cooling bond pad 102 can be actively cooled in order to increase survivability thereof.

Figure 2:
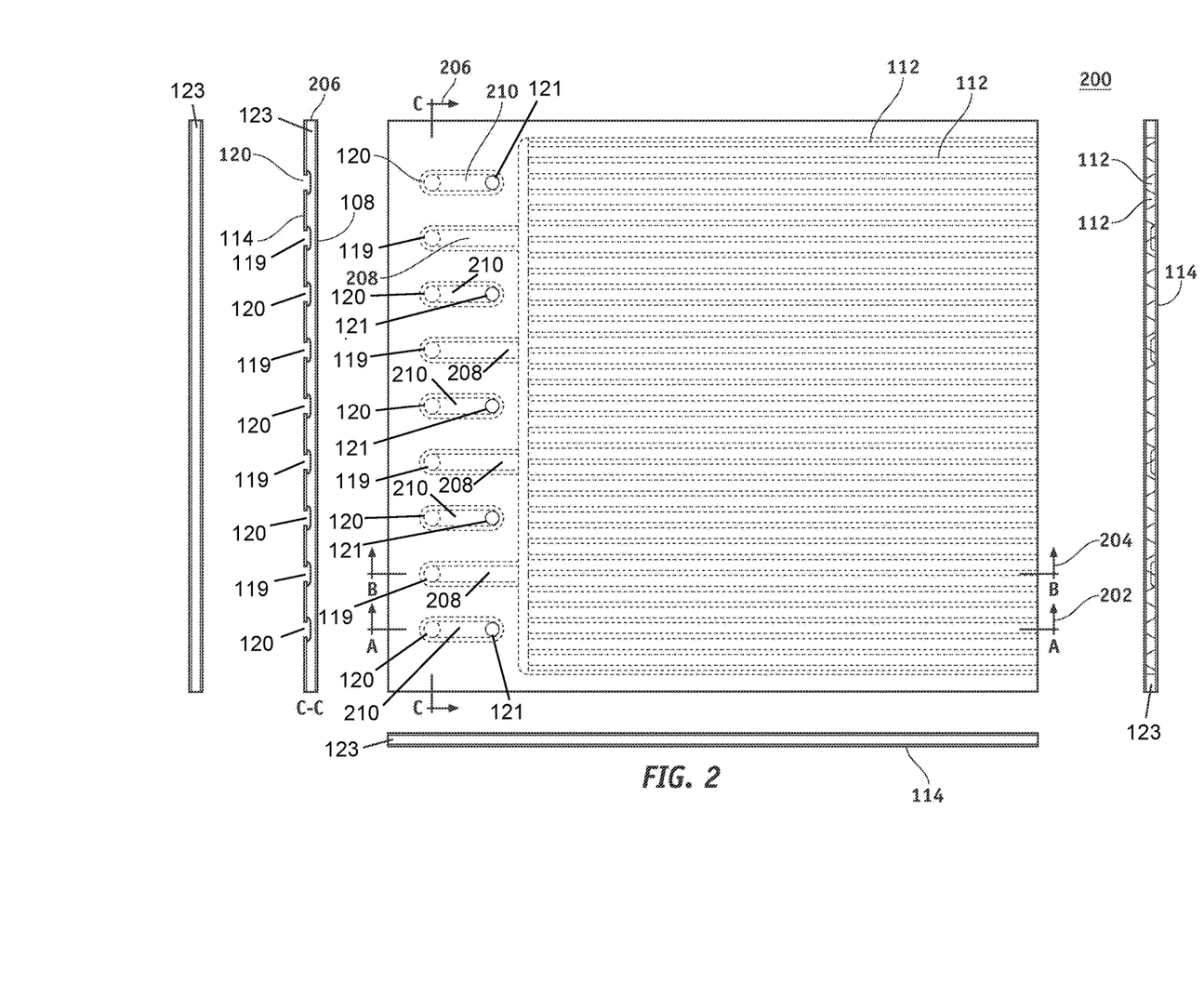
FIG. 2 is an illustration of a multi-channel cooling bond pad of the multi-channel cooling bond pad system of FIG. 1 showing more detail thereof according to an embodiment of the disclosure.

FIG. 2 is an illustration of a multi-channel cooling bond pad 200 showing more detail of the multi-channel cooling bond pad 102 of FIG. 1 according to an embodiment of the disclosure. FIG. 2 is described below in conjunction with FIG. 1. The multi-channel cooling bond pad 200 generally comprises the plurality of cooling holes 119, 120, 121, the plurality of internal-cooling channels 112, a plurality of internal-flow channels 208, and a plurality of external-flow channels 210.

The internal-flow channels 208 are configured to provide a lower pressure internal-coolant flow 302 (FIG. 3) suitable to cool the thermal shield bond line 106 and the structure bond line 116. The lower pressure cooling is structurally preferred over the higher pressure cooling fluid for the structural bond line because it results in lower stresses.

The external-flow channels 210 are not coupled to the internal-cooling channels 112. The external-flow channels 210 are configured to direct a through-coolant flow 304 (FIG. 3) to the thermal shield 104. The through-coolant flow 304 provides higher pressure cooling fluid channeled to reduce temperature of the thermal shield 104.

The cooling holes 120 (along a line C-C 206) are configured to allow a cooling fluid to flow from the external-flow channels 210 to the thermal shield 104 as shown in a cross section taken along a line A-A 202.

Figure 3:
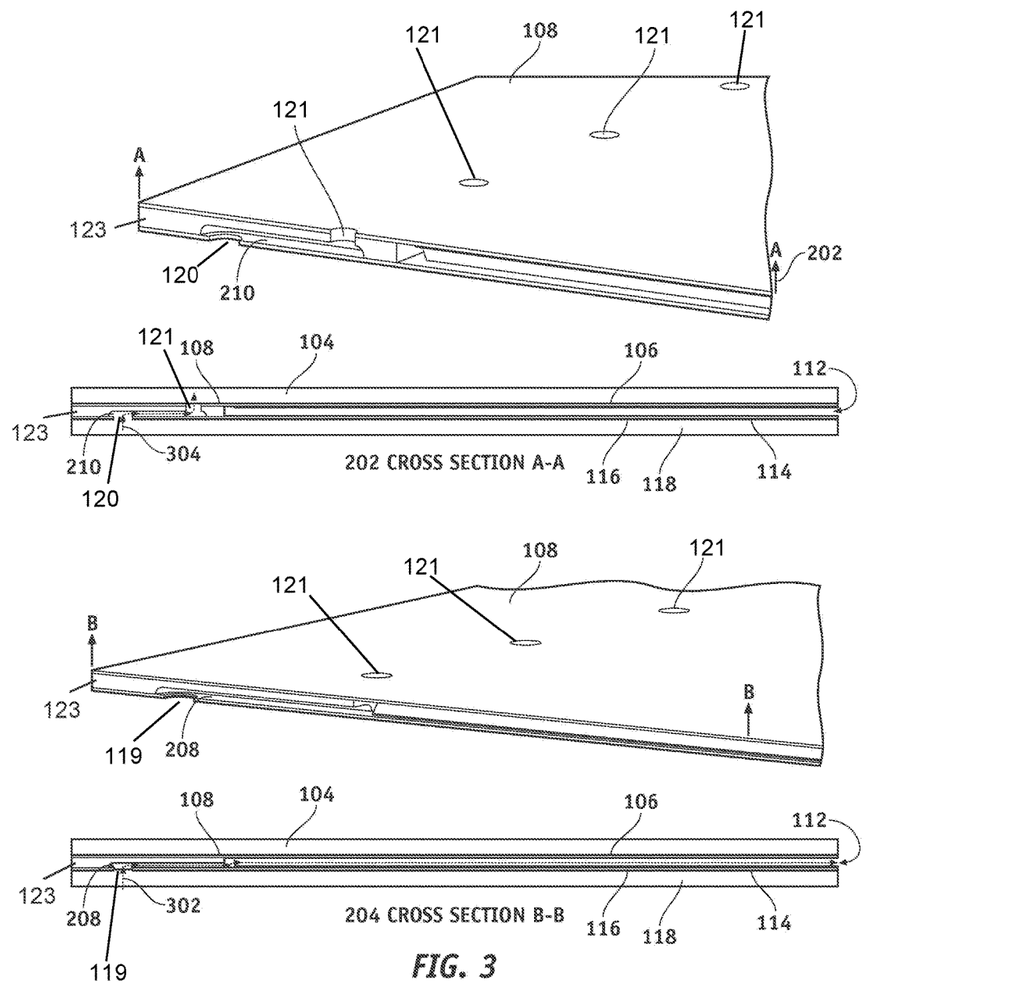
FIG. 3 is an illustration of cross sections of the multi-channel cooling bond pad of FIG. 2 taken along lines A-A and B-B thereof showing an internal-flow channel and an external-flow channel respectively according to an embodiment of the disclosure.

FIG. 3 is an illustration of cross sections of the multi-channel cooling bond pad 200 of FIG. 2 taken along a line A-A 202 showing the external-flow channels 210 and taken along a line B-B 204 showing the internal-flow channels 208 according to an embodiment of the disclosure. As shown in FIG. 3, the internal-coolant flow 302 and the through-coolant flow 304 flow into the internal-flow channels 208 and the external-flow channels 210 respectively. The internal-flow channels 208, the external-flow channels 210, and the plurality of internal-cooling channels 112 are disposed within the cooling bond pad layer 123.

Figure 4:
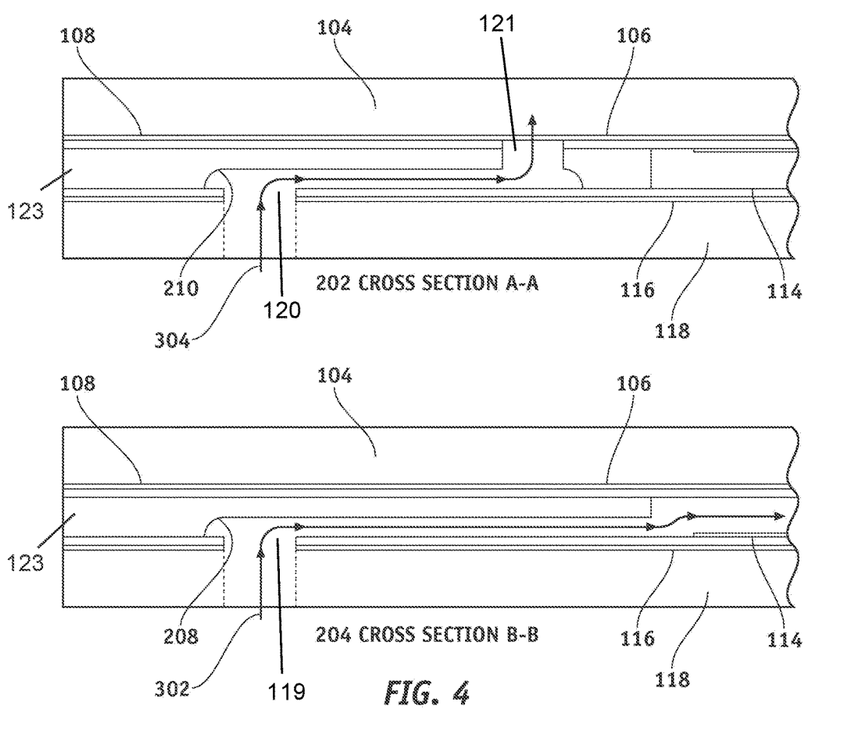
FIG. 4 is an illustration of expanded views of cross sections of the multi-channel cooling bond pad of FIG. 2 taken along lines A-A and B-B thereof showing an external-flow channel and an internal-flow channel respectively according to an embodiment of the disclosure.

FIG. 4 is an illustration of expanded views of cross sections of the multi-channel cooling bond pad 200 of FIG. 2 taken along a line A-A 202 showing the external-flow channels 210 and taken along a line B-B 204 showing the internal-flow channels 208 according to an embodiment of the disclosure.

Figure 5:
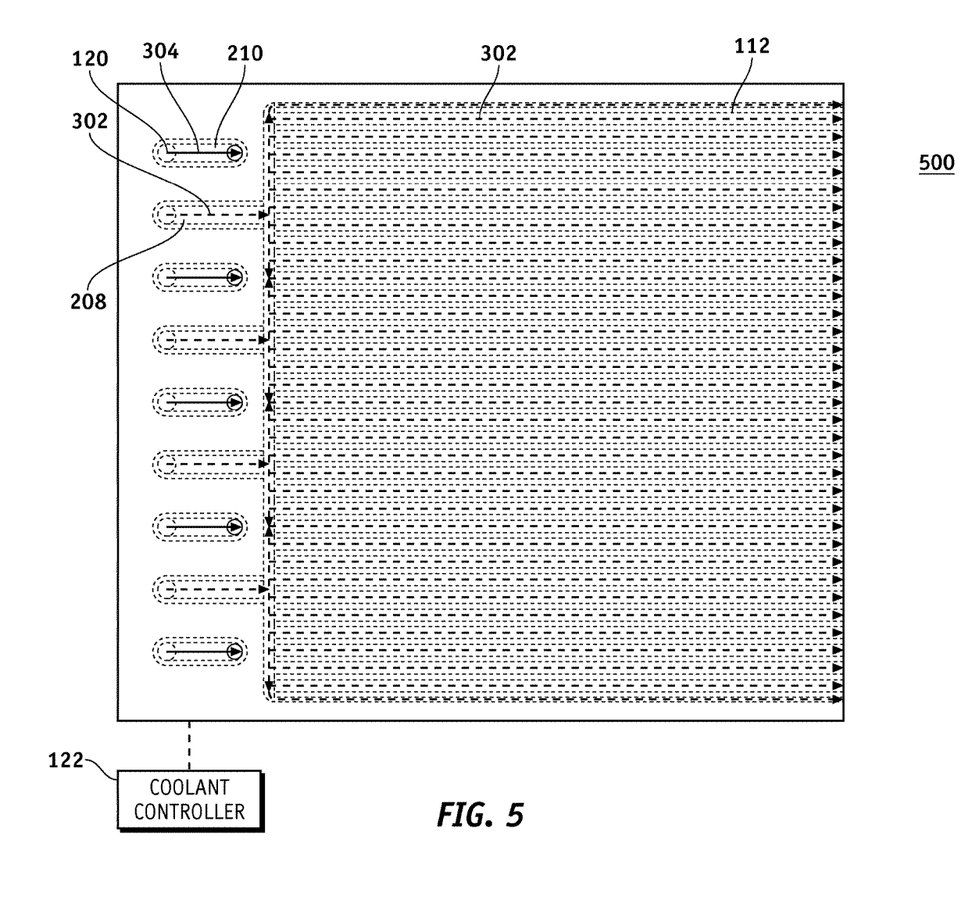
FIG. 5 is an illustration of a top view of a multi-channel cooling bond pad showing flow of a coolant fluid through internal-flow channels and external-flow channels of the multi-channel cooling bond pad according to an embodiment of the disclosure.

FIG. 5 is an illustration of a top view of a multi-channel cooling bond pad 500 showing flow of coolant fluid through the internal-flow channels 208 and the external-flow channels 210 according to an embodiment of the disclosure.

In operation, the internal-flow channels 208 coupled to the internal-cooling channels 112 direct the internal-coolant flow 302 to the internal-cooling channels 112 of the multi-channel cooling bond pad 500 thereby cooling the thermal shield bond line 106 and the structure bond line 116. This allows moderate temperature coupling means to be used in an otherwise high temperature environment. In this manner, the cooling bond pad 500 increases a survivability of the coupling means between the thermal shield 104 and the cooling bond pad 102/200/500 as explained above.

The external-flow channels 210 channel/direct the through-coolant flow 304 through the multichannel cooling bond pad 500 via the cooling holes 120 to the thermal shield 104 (FIG. 1) thereby cooling the thermal shield 104.

The coolant controller 122 tailors cooling flow rates, pressures, and temperatures through the internal-cooling channels 112 in order to ensure adequate surface cooling of the bond line cooling at the thermal shield bond line 106 and the structure bond line 116. In this manner, the multi-channel cooling bond pad 500 can be tailored to changing operational scenarios.

Embodiments of the disclosure mitigate cooling problems associated with multiple cooling requirements by providing multiple plenum channels. One second set of channels such as the internal-flow channels 208 fulfills the lower pressure cooling suitable to cool the structural bond line 116. The lower pressure cooling is structurally preferred over the higher pressure cooling air for the bond line because it results in lower stresses. Another set of channels such as the external-flow channels 210 are for higher pressure cooling fluid suitable to reduce a heat signature. The heat signature may comprise, for example but without limitation, an aerodynamic surface infrared heat level, an engine exhaust nozzle heat level, or other heat signature.

Figure 6:
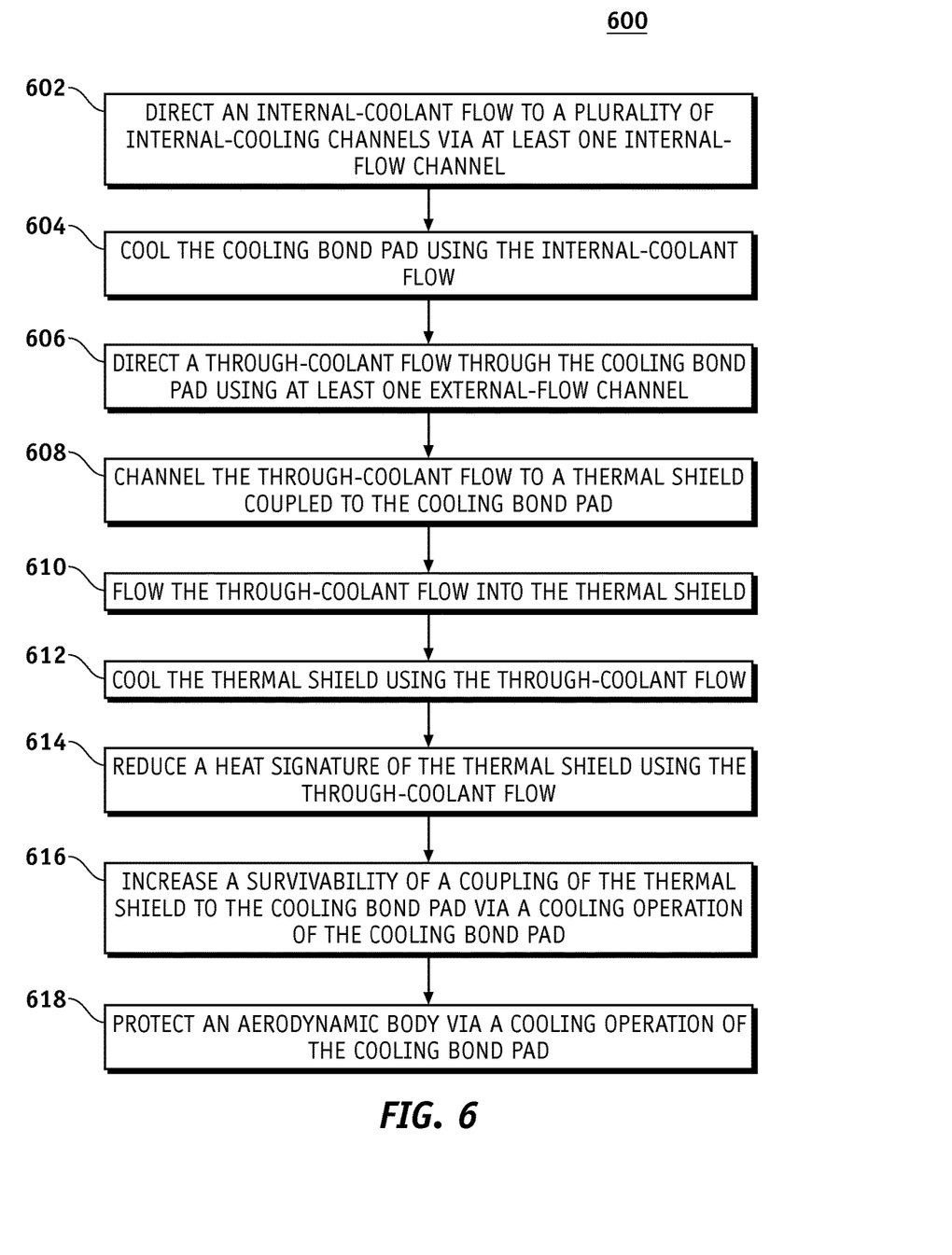
FIG. 6 is an illustration of an exemplary flowchart showing a cooling operation of a multi-channel cooling bond pad according to an embodiment of the disclosure.

FIG. 6 is an illustration of an exemplary flowchart showing a cooling operation (process 600) of a multi-channel cooling bond pad 102/200/500 according to an embodiment of the disclosure. The various tasks performed in connection with the process 600 may be performed mechanically, by software, hardware, firmware, a computer-readable medium having computer executable instructions for performing the processes methods, or any combination thereof. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein. For illustrative purposes, the following description of the process 600 may refer to elements mentioned above in connection with FIGS. 1-5.

In practical embodiments, portions of the process 600 may be performed by different elements of the system 100 such as: the top surface 108, the bottom surface 114, the cooling holes 119, 120, 121, the coolant controller 122, the internal-cooling channels 112, the internal-flow channels 208, the external-flow channels 210, etc. Process 600 may have functions, material, and structures that are similar to the embodiments shown in FIGS. 1-5. Therefore, common features, functions, and elements may not be redundantly described here.

Process 600 may begin by directing an internal-coolant flow such as the internal-coolant flow 302 to a plurality of internal-cooling channels such as the plurality of internal-cooling channels 112 via at least one internal-flow channel such as the internal-flow channel 208 (task 602).

Process 600 may continue by cooling a cooling bond pad such as the cooling bond pad 102/200/500 using the internal-coolant flow 302 (task 604).

Process 600 may continue by directing a through-coolant flow such as the through-coolant flow 304 through the cooling bond pad 102/200/500 using at least one external-flow channel such as the external-flow channel 210 (task 606).

Process 600 may continue by channeling the through-coolant flow 304 to a thermal shield such as the thermal shield 104 coupled to the cooling bond pad 102/200/500 (task 608).

Process 600 may continue by flowing the through-coolant flow 304 into the thermal shield 104 (task 610).

Process 600 may continue by cooling the thermal shield 104 using the through-coolant flow 304 (task 612).

Process 600 may continue by reducing a heat signature of the thermal shield 104 using the through-coolant flow 304 (task 614).

Process 600 may continue by increasing a survivability of a coupling of the thermal shield 104 to the cooling bond pad 102/200/500 via a cooling operation of the cooling bond pad 102/200/500 (task 616).

Process 600 may continue by protecting an aerodynamic body via a cooling operation of the cooling bond pad 102/200/500 (task 618). The aerodynamic body may comprise at least in part a portion of, for example but without limitation, a manned and unmanned ground, air, space vehicle that may be exposed to high temperature. An engine exhaust nozzle, a spacecraft nose-cone, and a spacecraft fuselage, are, without limitation, among examples of the aerodynamic body.

Figure 7:
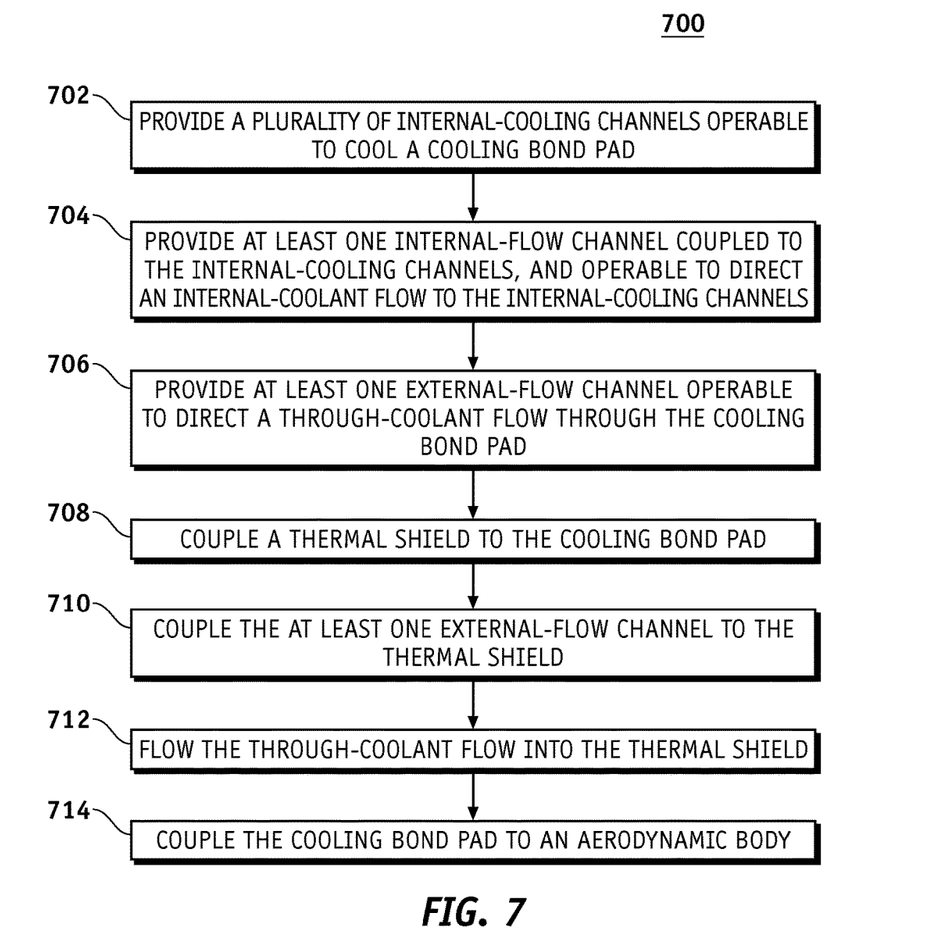
FIG. 7 is an illustration of an exemplary flowchart showing a process for providing an assembly comprising a multi-channel cooling bond pad according to an embodiment of the disclosure.

FIG. 7 is an illustration of an exemplary flowchart showing a process 700 for providing a multi-channel cooling bond pad 102/200/500 according to an embodiment of the disclosure. The various tasks performed in connection with the process 700 may be performed mechanically, by software, hardware, firmware, a computer-readable medium having computer executable instructions for performing the processes methods, or any combination thereof. It should be appreciated that process 700 may include any number of additional or alternative tasks, the tasks shown in FIG. 7 need not be performed in the illustrated order, and the process 700 may be incorporated into a more comprehensive procedure or process having additional functionality not described in detail herein. For illustrative purposes, the following description of the process 700 may refer to elements mentioned above in connection with FIGS. 1-5.

In practical embodiments, portions of the process 700 may be performed by different elements of the system 100 such as: the top surface 108, the bottom surface 114, the cooling holes 119, 120, 121, the internal-cooling channels 112, the coolant controller 122, etc. Process 700 may have functions, material, and structures that are similar to the embodiments shown in FIGS. 1-5. Therefore, common features, functions, and elements may not be redundantly described here.

Process 700 may begin by providing a plurality of internal-cooling channels such as the internal-cooling channels 112 operable to cool a cooling bond pad such as the cooling bond pad 102/200/500 (task 702).

Process 700 may continue by providing at least one internal-flow channel such as the internal-flow channel 208 coupled to the internal-cooling channels 112, and operable to direct an internal-coolant flow such as the internal-coolant flow 302 to the internal-cooling channels 112 (task 704).

Process 700 may continue by providing at least one external-flow channel such as the external-flow channel 210 operable to direct a through-coolant flow such as the through-coolant flow 304 through a cooling bond pad such as the cooling bond pad 102 (task 706).

Process 700 may continue by coupling the thermal shield 104 to the cooling bond pad 102 (task 708).

Process 700 may continue by coupling the external-flow channel 210 to the thermal shield 104 (task 710).

Process 700 may continue by flowing the through-coolant flow 304 into the thermal shield 104 (task 712).

Process 700 may continue by coupling the cooling bond pad 102 to an aerodynamic body (task 714). The aerodynamic body may comprise at least in part a portion of, for example but without limitation, a manned and unmanned ground, air, space vehicle that may be exposed to high temperature. An engine exhaust nozzle, a spacecraft nosecone, and a spacecraft fuselage, are, without limitation, among examples of the aerodynamic body.

In this way, a hot surface thermal protection pad such as the cooling bond pad 102 that has rapidly replaceable ceramic foam insulation is provided. In addition, the ceramic foam of the hot surface thermal protection pad can be actively cooled in order to increase its survivability.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A cooling system for a cooling bond pad comprising:
a first surface of the cooling bond pad, wherein the cooling bond pad includes a first plurality of cooling holes through the first surface and a second plurality of cooling holes through the first surface;
a second surface of the cooling bond pad, wherein the cooling bond pad includes a plurality of cooling holes through the second surface;
a single cooling bond pad layer disposed between and in direct contact with both the first surface of the cooling bond pad and the second surface of the cooling bond pad;
a plurality of internal-cooling channels disposed between the first surface and the second surface;
a plurality of internal-flow channels disposed within the single cooling bond pad layer, wherein the plurality of internal-flow channels are separate from and coupled to the internal-cooling channels and the second plurality of cooling holes through the first surface, and wherein the plurality of internal-flow channels are configured to direct an internal-coolant flow into the internal-cooling channels;
a thermal shield coupled to the second surface of the cooling bond pad; and
a plurality of external-flow channels disposed within the single cooling bond pad layer, wherein the plurality of external-flow channels are separate from the plurality of internal-flow channels and the plurality of internal-cooling channels, and are not coupled to the plurality of internal-flow channels and the plurality of internal-cooling channels, and wherein the plurality of external flow channels are configured to direct a coolant flow through the cooling bond pad via the first plurality of cooling holes through the first surface and the plurality of cooling holes through the second surface to thereby cool the thermal shield.

2. The cooling system of claim 1, wherein the plurality of external-flow channels are fluidly coupled to the thermal shield.

3. The cooling system of claim 1, wherein the coolant flow cools the thermal shield such that a heat signature of the thermal shield is reduced.

4. The cooling system of claim 1, further comprising: coupling means coupling the first surface to an object.

5. The cooling system of claim 4, wherein directing the internal-coolant flow into the internal-cooling channels increases a survivability of the coupling means.

6. The cooling system of claim 4, wherein:
the object comprises at least one of: an aircraft structure, an aerodynamic body, and a structure; and
the coupling means comprises at least one of: a bond line, an adhesive, a weld, a superplastic diffusion, and a mechanical coupling.

7. The cooling system of claim 1, further comprising:
a coolant controller configured to tailor coolant characteristics of the cooling bond pad by controlling cooling flow rates, pressures, and temperatures through the internal-cooling channels based on operational scenarios.

8. The cooling system of claim 1, wherein a coolant for the coolant flow through the cooling bond pad comprises water.

9. The cooling system of claim 1, wherein the coolant flow through the cooling bond pad flows into the thermal shield.

10. The cooling system of claim 1, wherein the cooling bond pad is made from a ceramic foam material, a composite material, metal, or plastic.

11. The cooling system of claim 1, wherein the plurality of internal-cooling channels are configured for the internal-coolant flow to flow through the internal cooling channels.

12. The cooling system of claim 1, further comprising:
a coolant controller configured to control a flow rate, pressure or temperature of coolant in the cooling bond pad.

13. A method for cooling a cooling bond pad, wherein the cooling bond pad comprises (i) a thermal shield, (ii) a first surface coupled to an object through coupling means, (iii) a second surface coupled to the thermal shield, (iv) a first plurality of cooling holes through the first surface and a second plurality of cooling holes through the first surface, (v) a plurality of cooling holes through the second surface, and (vi) a single cooling bond pad layer disposed between and in direct contact with both the first surface of the cooling bond pad and the second surface of the cooling bond pad, the method comprising:
directing an internal-coolant flow to a plurality of internal-cooling channels disposed between the first surface and the second surface via a plurality of internal-flow channels disposed within the single cooling bond pad layer, wherein the plurality of internal-flow channels are separate from and coupled to the internal-cooling channels and the second plurality of cooling holes through the first surface;
cooling the cooling bond pad using the internal-coolant flow;
providing a plurality of external-flow channels disposed within the single cooling bond pad layer, wherein the plurality of external-flow channels are separate from the plurality of internal-flow channels and the plurality of internal-cooling channels, and are not coupled to the plurality of internal-flow channels and the plurality of internal cooling channels; and
directing a coolant flow through the cooling bond pad via the first plurality of cooling holes through the first surface and the plurality of cooling holes through the second surface thereby cooling the thermal shield.

14. The method of claim 13, further comprising:
controlling cooling the object and the coupling means using the internal-coolant flow.

15. The method of claim 13, further comprising:
controlling cooling flow rates, pressures, and temperatures through the internal-cooling channels based on operational scenarios.

16. The method of claim 13, further comprising:
reducing a heat signature of the thermal shield using the coolant flow.

17. The method of claim 13, further comprising:
increasing a survivability of a coupling of the thermal shield to the cooling bond pad via a cooling operation of the cooling bond pad.

18. The method of claim 13, further comprising:
protecting an aerodynamic body via a cooling operation of the cooling bond pad.

19. A method for providing a cooling system for a cooling bond pad comprising:
providing a first surface of the cooling bond pad, wherein the cooling bond pad includes a first plurality of cooling holes through the first surface and a second plurality of cooling holes through the first surface;
providing a second surface of the cooling bond pad, wherein the cooling bond pad includes a plurality of cooling holes through the second surface;
providing a single cooling bond pad layer between and in direct contact with both the first surface of the cooling bond pad and the second surface of the cooling bond pad;
providing a plurality of internal-cooling channels disposed between the first surface and the second surface;
configuring the cooling bond pad with a plurality of internal-flow channels disposed within the single cooling bond pad layer, wherein the plurality of internal-flow channels are separate from and coupled to the internal-cooling channels and the second plurality of cooling holes through the first surface, and wherein the plurality of internal-flow channels are configured to direct an internal-coolant flow into the internal-cooling channels;
coupling a thermal shield to the second surface of the cooling bond pad; and
configuring the cooling bond pad with a plurality of external-flow channels disposed within the single cooling bond pad layer,
wherein the plurality of external flow channels are separate from the plurality of internal-flow channels and the plurality of internal-cooling channels and are not coupled to the plurality of internal-flow channels and the plurality of internal-cooling channels, and wherein the plurality of external flow channels are configured to direct a coolant flow through the cooling bond pad via the first plurality of cooling holes through the first surface and the plurality of cooling holes through the second surface to thereby cool the thermal shield.

20. The method of claim 19, further comprising:
fluidly coupling the plurality of external-flow channels to the thermal shield.

21. The method of claim 19, further comprising:
coupling the first surface of the cooling bond pad to an aerodynamic body.

22. The method of claim 19, wherein a coolant for the coolant flow through the cooling bond pad comprises water.

23. The method of claim 19, wherein the coolant flow through the cooling bond pad flows into the thermal shield.

24. The method of claim 19, wherein the cooling bond pad is made from a ceramic foam material, a composite material, metal, or plastic.

25. The method of claim 19, wherein the plurality of internal-cooling channels are configured for the internal-coolant flow to flow through the internal cooling channels.

26. The method of claim 19, further comprising:
controlling a flow rate, pressure, or temperature of coolant in the cooling bond pad.

* * * * *